US007665085B2

(12) United States Patent
Sundararajan et al.

(10) Patent No.: US 7,665,085 B2
(45) Date of Patent: Feb. 16, 2010

(54) FLEXIBLE DEPLOYMENT OF SOFTWARE APPLICATIONS

(75) Inventors: Parthasarathy Sundararajan, Chennai Tamil Nadu (IN); Shyamala Jayaraman, Chennai Tamil Nadu (IN); Suresh Sathiavageeswaran, Chennai Tamil Nadu (IN); Krishnamoorthy Meenakshisundaram, Chennai Tamil Nadu (IN); Raghuram Devalla, Chennai Tamil Nadu (IN); Srirangan Pandimani, Chennai Tamil Nadu (IN); Natarajan Krishnan, Chennai Tamil Nadu (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 461 days.

(21) Appl. No.: 11/075,500

(22) Filed: Mar. 9, 2005

(65) Prior Publication Data
US 2005/0204354 A1 Sep. 15, 2005

Related U.S. Application Data

(60) Provisional application No. 60/553,269, filed on Mar. 15, 2004, provisional application No. 60/553,254, filed on Mar. 15, 2004, provisional application No. 60/553,635, filed on Mar. 16, 2004.

(51) Int. Cl.
*G06F 9/445* (2006.01)
*G06F 9/44* (2006.01)
*G06F 15/16* (2006.01)

(52) U.S. Cl. .................. 717/174; 717/103; 717/104; 717/177; 709/201; 709/205

(58) Field of Classification Search ......... 717/168–178, 717/103–104; 709/201, 205
See application file for complete search history.

(56) References Cited

U.S. PATENT DOCUMENTS

| 5,495,610 | A | 2/1996 | Shing et al. | |
|---|---|---|---|---|
| 6,374,401 | B1 * | 4/2002 | Curtis | 717/175 |
| 6,385,766 | B1 * | 5/2002 | Doran et al. | 717/174 |
| 6,604,237 | B1 * | 8/2003 | Giammaria | 717/174 |
| 6,947,943 | B2 * | 9/2005 | DeAnna et al. | 707/100 |
| 6,996,599 | B1 * | 2/2006 | Anders et al. | 709/201 |
| 7,047,518 | B2 * | 5/2006 | Little et al. | 717/108 |
| 7,065,769 | B1 * | 6/2006 | Tolopka | 719/321 |
| 7,072,807 | B2 * | 7/2006 | Brown et al. | 703/1 |
| 7,093,232 | B1 * | 8/2006 | Chatzigianis et al. | 717/122 |
| 7,210,143 | B2 * | 4/2007 | Or et al. | 717/174 |

(Continued)

OTHER PUBLICATIONS

Purao et al. "Product metrics for object-oriented systems" Jun. 2003, ACM Computing Surveys (Csur) vol. 35 Issue 2, pp. 191-221.*

(Continued)

*Primary Examiner*—Anna Deng
(74) *Attorney, Agent, or Firm*—Prakash Nama; Global IP Services, PLLC

(57) ABSTRACT

A system and method for deploying software is disclosed. In one embodiment, information regarding software components and their interactions, deliverables and deployment descriptors, hardware topology, layer information, and database information are all captured in a model. The model in then used to install the software on a particular machine. In another embodiment, an organizational structure is used to create an access map, and access rights to the installed software are generated and enforced.

18 Claims, 7 Drawing Sheets

U.S. PATENT DOCUMENTS

| | | | |
|---|---|---|---|
| 7,213,026 B2* | 5/2007 | Evans et al. | 707/101 |
| 7,243,306 B1* | 7/2007 | Joshi et al. | 715/735 |
| 7,263,551 B2* | 8/2007 | Belfiore et al. | 709/219 |
| 7,337,184 B1* | 2/2008 | Or et al. | 707/102 |
| 2003/0191769 A1* | 10/2003 | Crisan et al. | 707/100 |
| 2005/0091093 A1* | 4/2005 | Bhaskaran et al. | 705/7 |

OTHER PUBLICATIONS

Chalmers et al. "On the topology of multicast trees", Feb. 2003 IEEEE Press, TON vol. 11 Issue 1, pp. 153-165.*

Rettberg et al. "Embedded System Design Based On webservices", Mar. 2002, IEEE Computer Society, 5 pages.*

Dahlin et al. "End-to-end WAN service availability", Apr. 2003, IEEE Press, IEEE./ACM TON vol. 11, Issue 2, pp. 300-313.*

YangY Ed-Institute of Electrical and Electronics Engineers:"Change management in object-oriented databases" Mar. 23, 1993, Proceedings of the International Phoenix Conference on Computers and Communications, Tempe, Mar. 23-26, 1993, New York, IEEE, US, pp. 238-244, XP010110035 ISBN: 0-7803-0922-7 the whole document.

* cited by examiner

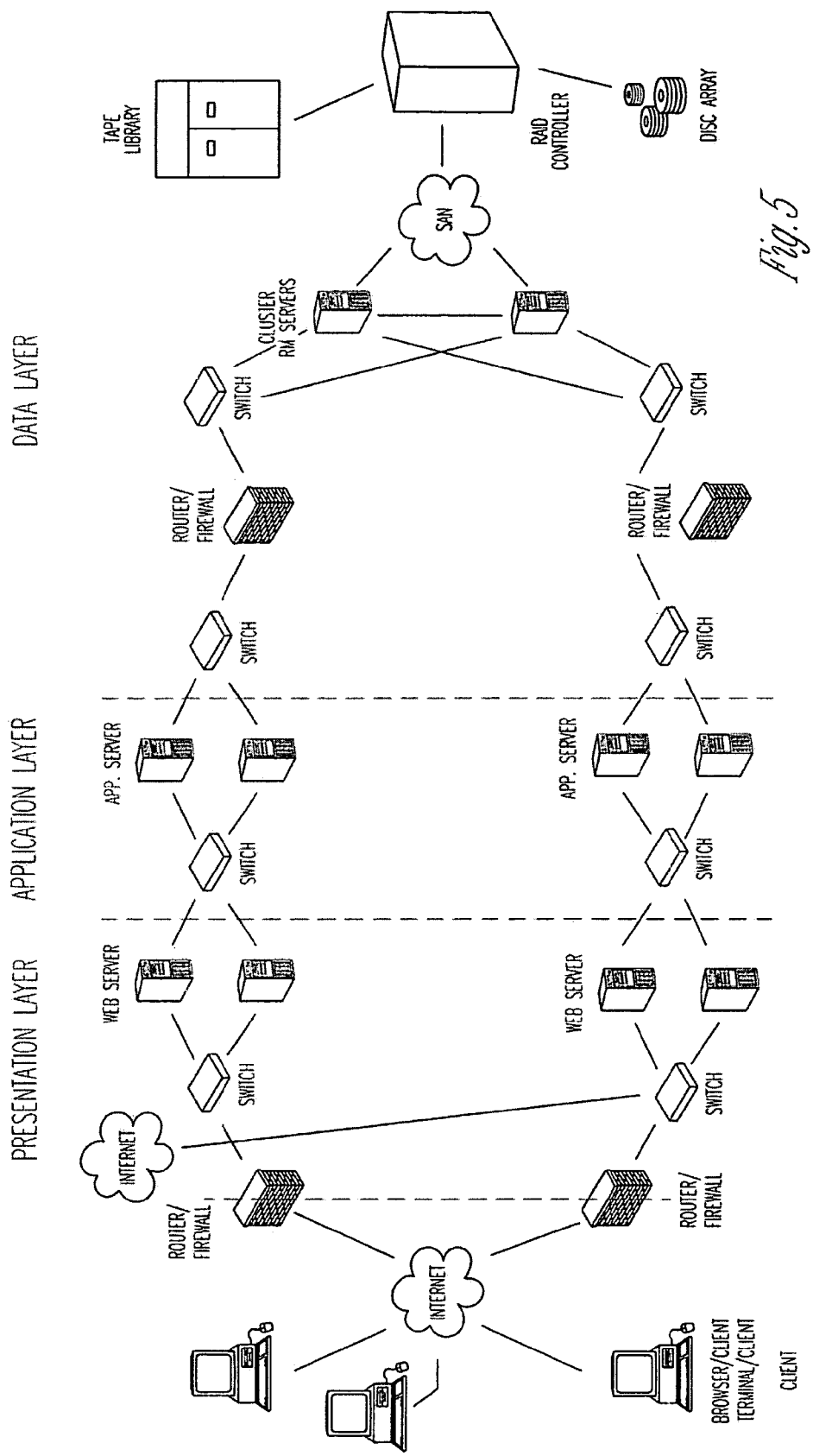

FLEXIBLE DEPLOYMENT OF SOFTWARE APPLICATIONS

RELATED APPLICATIONS

Benefit is claimed under 35 U.S.C. 119(e) to U.S. Provisional Application Ser. No. 60/553,635, entitled "An Approach for Automating Deployment of Software Applications Independent of Technology Platform" by inventor Parthasarathy Sundararajan et al., filed Mar. 16, 2004, which is herein incorporated in its entirety by reference for all purposes.

Benefit is claimed under 35 U.S.C. 119(e) to U.S. Provisional Application Ser. No. 60/553,269, entitled "An Approach to Flexible Software Deployment of Business Component" by inventor Parthasarathy Sundararajan et al., filed Mar. 15, 2004, which is herein incorporated in its entirety by reference for all purposes.

Benefit is claimed under 35 U.S.C. 119(e) to U.S. Provisional Application Ser. No. 60/553,254, entitled "Software Structure Driven Approach to Implementation" by inventor Parthasarathy Sundararajan et al., filed Mar. 15, 2004, which is herein incorporated in its entirety by reference for all purposes.

FIELD OF INVENTION

The present invention relates to the deployment of software systems, and in particular, the automated deployment of software systems independent of technology platforms.

BACKGROUND OF INVENTION

Large software systems are normally divided into multiple subsystems that are developed as individual components. Interactions between these subsystems and/or components must be properly depicted in order to provide for smooth deployment. Moreover, in multi-layered systems, individual components of the application have their equivalent parts deployed over multiple layers. For example, components might be distributed across databases in a resource manager layer. Information about the deployment of parts of each component must be known in other layers so as to have accessibility within and across components for each layer and across layers.

Normally component interactions and deployment are depicted using Unified Modeling Language (UML) diagrams and deployment is done manually. Because of this, for multi-layered applications, topology selection becomes a most problematic task for application deployment. Various factors like security, performance, throughput, scalability, availability, maintainability and session management should be considered during the review of requirements so as to formulate the topology selection criteria.

A related issue, hardware sizing, is sometimes arrived at after making an estimate about the size of the applications and the appropriate topology selection. In contrast, there may be situations where topology selection is already constrained by the existing hardware. While fine-tuning the live applications for factors such as those mentioned above, a trial and error approach to arrive at a final optimal solution is unavoidable. When the number of users increases, it is necessary to add extra server instances to cater to the increased user requests and also to load balance across the machines.

In a multi tier system, it is possible to deploy software artifacts of different layers in a multitude of permutations and combinations. This is compounded by the fact that the hardware platform can be distributed with each platform catering to a subset of the user groups. One example in which this is required is with large organizations that are located across the globe. By contrast, for small organizations, there is a need to deploy the application in a minimum mode configuration with all layers resident on the same physical hardware. During deployment, the application architecture in terms of component interaction, the organizational structure in terms of functions performed in different organization units, as well as the hardware topology in terms of servers hosting different layers, must all be balanced and correct for the proper functioning of the application. The use of manual systems to deploy such complex applications with a lot of interdependencies is fraught with dangers (such as missed elements), and do not explicitly formalize software deployment and roll out.

Additionally, current practices and tools for software deployment deal with only the technical aspects of deploying software onto the respective hardware structures, and the administration of access specifications to business functions and users is disjoint. Moreover, when there is a reorganization and consequent redeployment, existing practices are cumbersome and are dependent on detailed manual documentation of deployment maps. The current set of technologies and distributed processing schemes make the task even tougher.

BRIEF DESCRIPTION OF THE DRAWINGS

FIG. 5 illustrates a large distributed enterprise upon which a software system may be deployed using an embodiment of the invention.

DETAILED DESCRIPTION OF INVENTION

An embodiment of the invention uses a model-driven software development and deployment scheme to automate deployment of software. From information captured in the model, a deployment scheme can be developed according to the topology selection.

Figure 1:
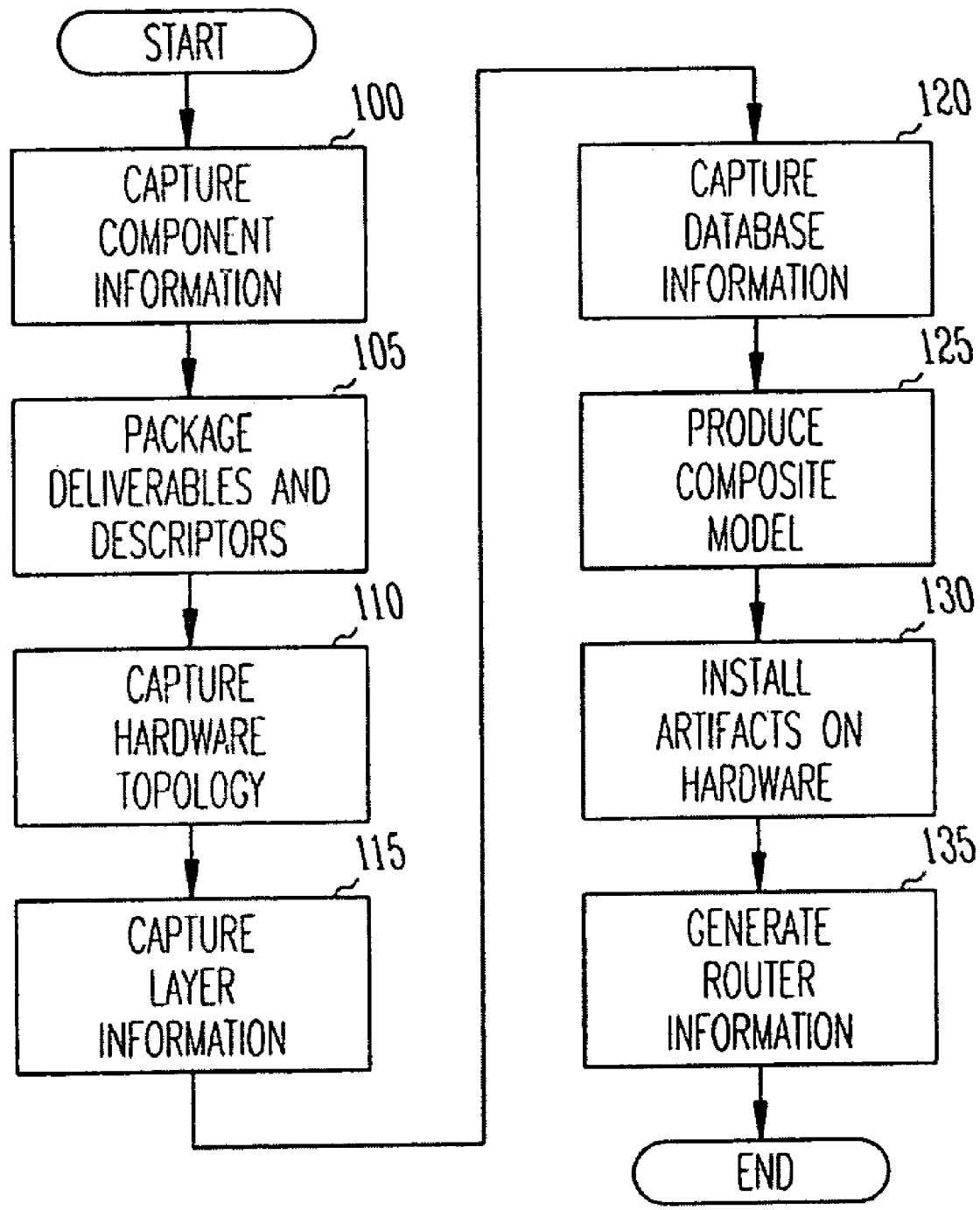
FIG. 1 is a flowchart of an embodiment of the invention.

FIG. 1 illustrates an embodiment of the invention. In a model-driven approach for software development in block 100, all the information about components of a software application and their interactions are captured in the model in terms of the services offered by the components and used by the other components. From this information, in block 105, the deliverables for a component can be automatically packaged along with the necessary deployment descriptors.

The topology of the hardware is also captured in the model at block 110. This includes the details of machines on which the software will run, and their configuration information like operating systems and IP-addresses. The topology of the software includes the type of the application server and the necessary application server instances in each machine, which is captured along with the layer information (e.g. presentation layer, middle layer, and resource manager layer) at block 115.

In block 120, the necessary details about databases and database servers are also captured in the model.

For the presentation layer and the middle layer, the components are mapped to the machine and an appropriate application server instance. For the resource manager layer, the required components are mapped to the machines where database servers are available. Data sources for these databases are automatically depicted in the model.

From the model, deployment information is available for each machine and installation. It is also possible to drive software updates on a per machine basis from the model information. In Java™ 2 Platform, Enterprise Edition (J2EE) environments, most of the application servers implement JMX architecture for their configuration management. By employing Java™ Management Extension (JMX) architecture coupled with a modeled deployment scheme, the deployment process is completely automated.

The deployment of a multi tier application is an extremely complex process since there is a lot of interaction among the software artifacts of different layers. However, in one embodiment of the invention, use of a business component model and the organization structure enables the deployment of software in different hardware topologies in the most optimal manner. To manage the deployment, the application is developed as a set of interacting business components, with different functions performed by different roles in the organization implemented as business components. Based on the functions performed by the different units of the organization, deployment may be limited to the pertinent components and their related functions.

The interaction of each instance of the business functions as performed in different organization units is modeled in a deployment repository. This interaction information is used to arrive at the business component deployment for different organizations. The hardware information is also modeled as implementing the different software layers, e.g. Web layer, application layer, database layer, etc. Referring again to FIG. 1, this model is superimposed with the business function implementation model to arrive at a composite model at block 125 comprising a software layer, a hardware platform, a business function, and an organization structure mapping.

This composite model is then used to install the requisite artifacts for a given hardware platform at block 130. This ensures the generation of all dependencies and connectivity requirements. This model is also used to generate the required router information at block 135 for correctly routing the information across different layers. Moreover, static load balancing of all layers could be done by using a scaled out model of implementations where the platforms at the required layers are added based on the load of the system.

Figure 6:
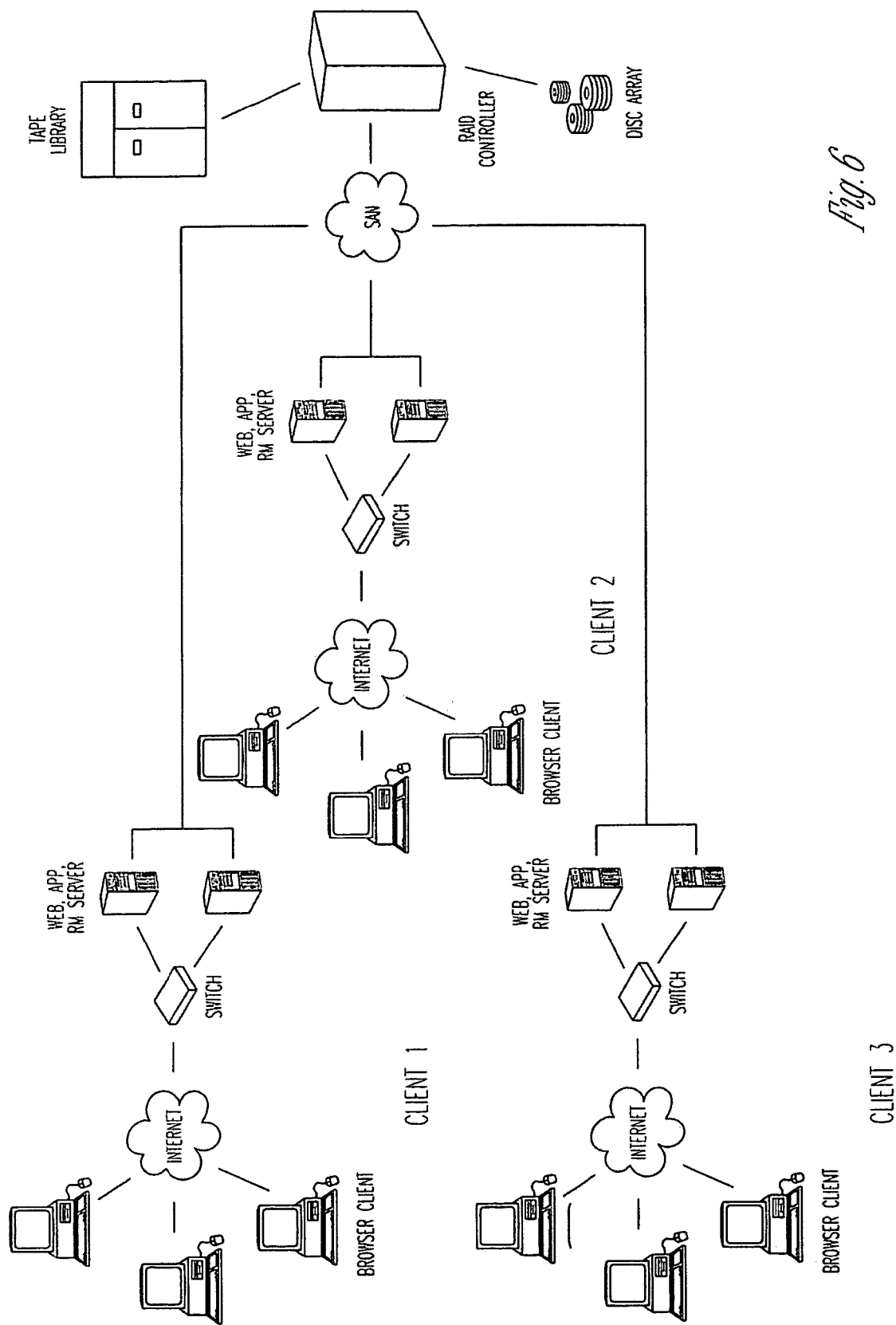
FIG. 6 illustrates a small distributed enterprise upon which a software system may be deployed using an embodiment of the invention.

Embodiments of the invention that use such a modeling approach for deployment of component-based systems provide extreme flexibility for deploying software for different types of organization models. It helps to support either a centralized deployment model, a distributed deployment model, or a combination of a few functions that are distributed and a few other functions that are centrally deployed. Also, it is possible to deploy all layers in a single hardware platform, or to implement layers in multiple platforms. Additionally, embodiments of the invention can be used to deploy software systems across large distributed enterprises such as illustrated in FIG. 5, or smaller enterprises such as illustrated in FIG. 6.

This embodiment of implementation of deployment architecture aids in adding organization units and functions to an existing system. The deployment information is modified to take care of the changes in the organization structure and the business functions to arrive at a new model. This can then be evaluated against the intended usage to arrive at the requisite hardware.

Figure 3:
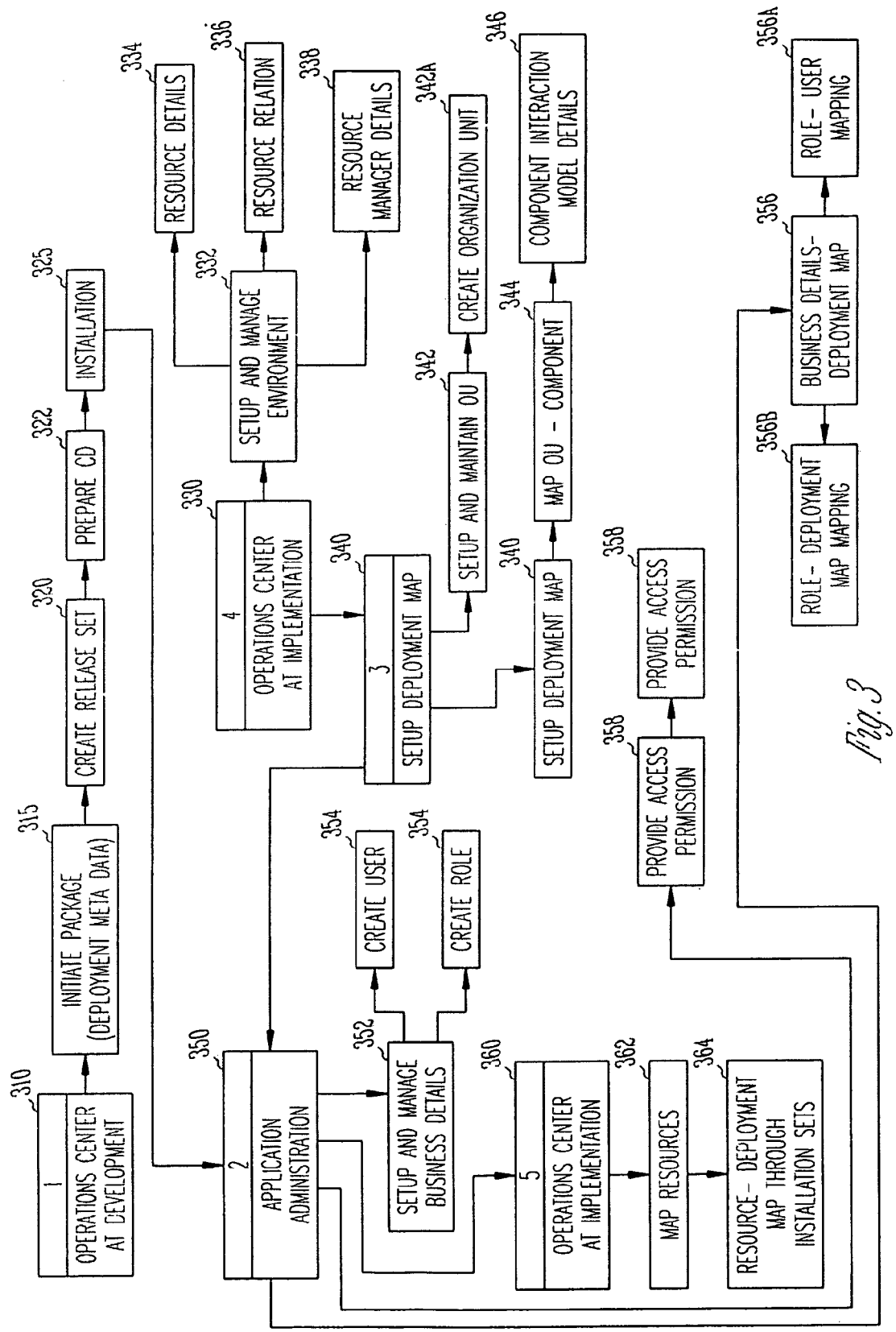
FIG. 3 illustrates an example of a rollout model.

An example of a rollout model is illustrated in FIG. 3. A component is first developed (310), packaging initiated (315) (including deploying meta data), a release set is created (320) (for example on a CD—322), and the model is then installed on the system (325). At the time of installation, the administration of the component application commences. Specifically, a resource administrator (330) sets up and manages the software (332) which involves overseeing resource details (334), resource relations (336), and resource management details (338). Further in this example, at rollout or deployment, a deployment map is set up (340), which involves setting up and maintaining an organization unit (342, 342*a*), mapping the organization unit to the component (344), and component interaction model details (346). General application administration (350) in this example includes setting up and managing business details (352), such as creating users and roles (354), relating the business details to the deployment map (356) (role-user mapping (356*a*) and role-deployment mapping (356*b*)), and providing access to the deployed software (358). Finally, in this example, an operations center (360) at the time of implementation maps resources (362), that is, a resource-deployment map through installation sets (364).

Figure 4A:
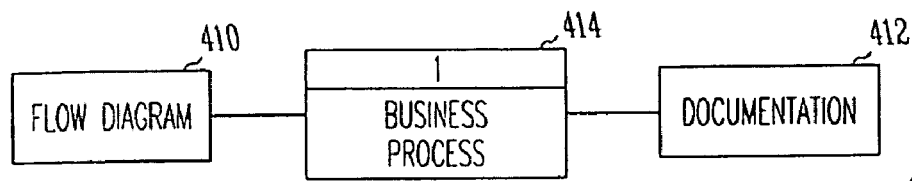
FIG. 4 illustrates a software structure and a manner to map and link to artifacts.
Figure 4B:
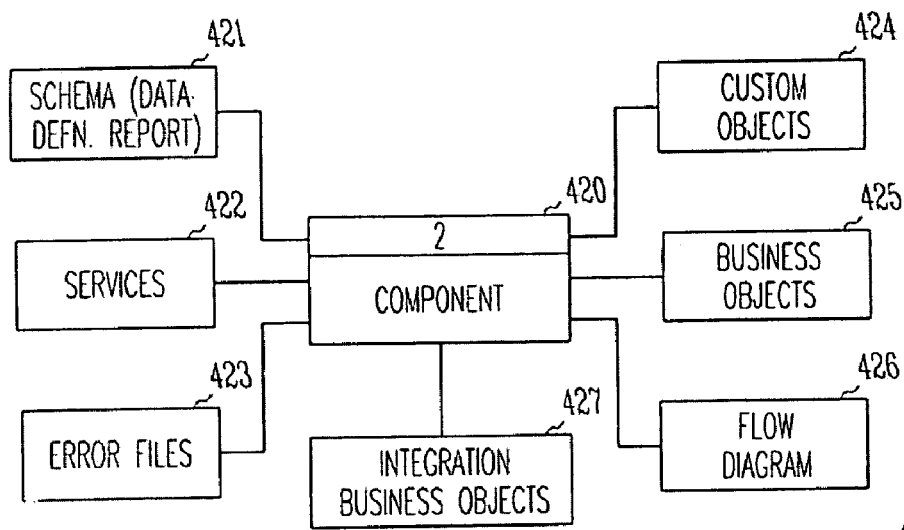
Figure 4C:
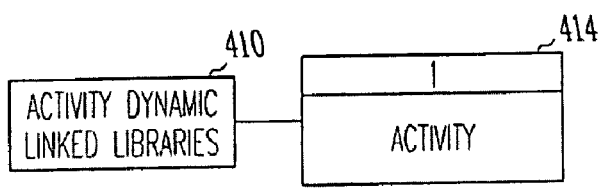
Figure 4D:
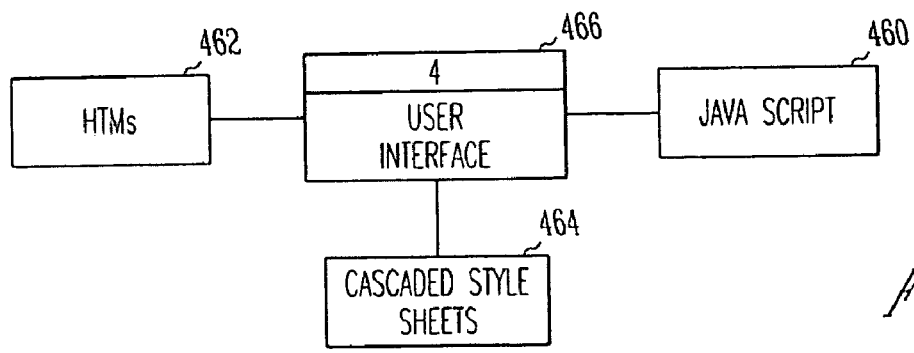

In an embodiment of the invention, a software structure that provides the business view of software functioning is available in the specification repository. The artifacts to be deployed are mapped to software structure and the link to the business view is maintained. FIG. 4 illustrates an example of a software structure and a manner in which artifacts are mapped and linked to a business view. Specifically, in FIG. 4*a*, flow diagram (410) and documentation artifacts (412) are deployed, and are linked to a business process business view (414). In FIG. 4*b*, a component business view (420) is linked to a plurality of artifacts—schema (421), services (422), error files (423), custom objects (424), business objects (425), flow diagram (426), and integration business objects artifacts (427). In FIG. 4*c*, a single artifact, activity dynamic linked libraries (430), is linked to an activity business view (432). In FIG. 4*d*, a JAVA™ script (460), HTMs (462), and style sheets artifact (464) are linked to a user interface business view (466).

Figure 2:
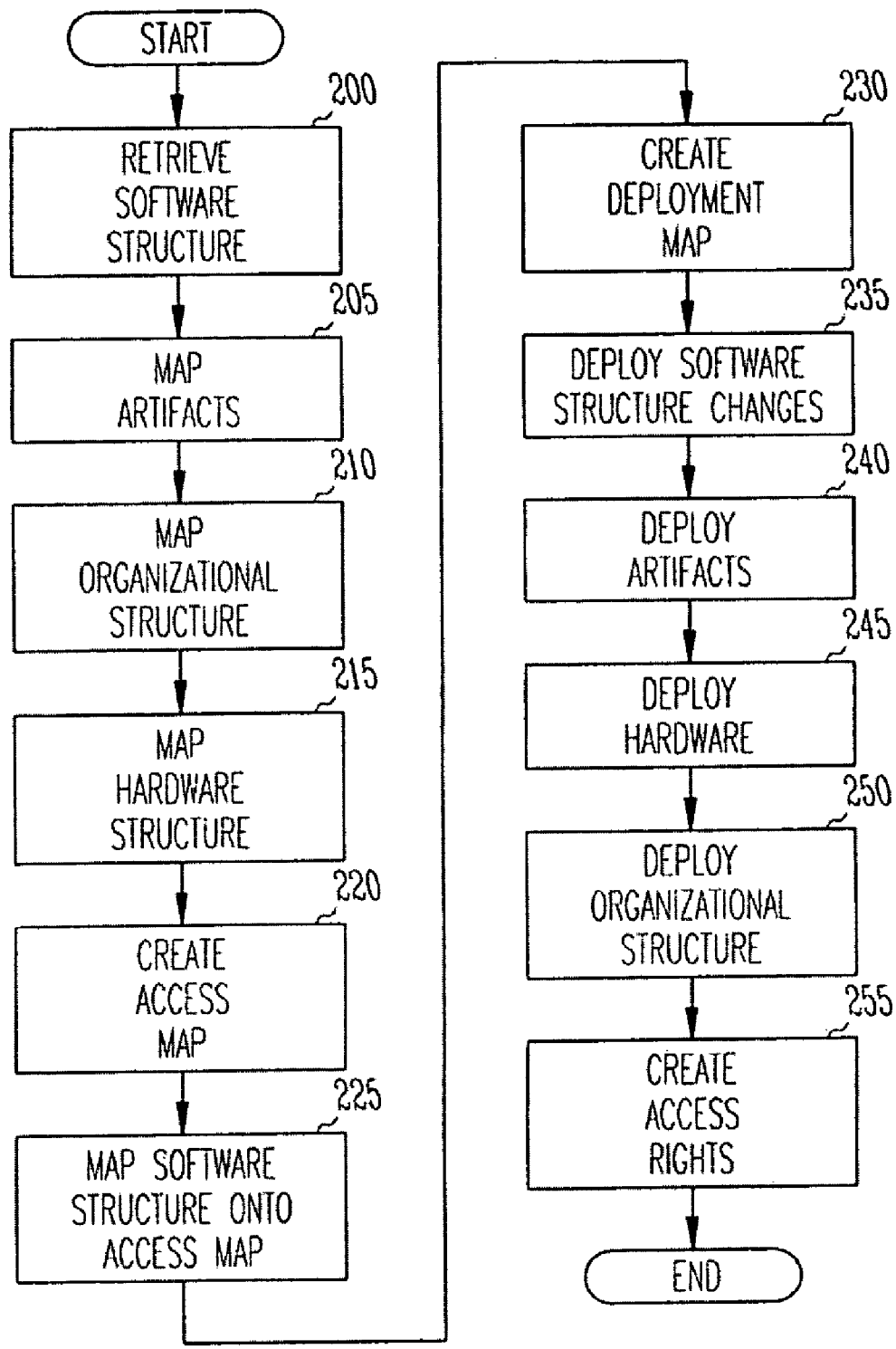
FIG. 2 is a flowchart of another embodiment of the invention.

In an embodiment, the steps in a scheme to deploy software are illustrated in FIG. 2. First, the software structure is retrieved in block 200 and the artifacts are mapped in block 205. Next, a map of the organizational structure is created at block 210. Third, in block 215, a map of the hardware structure is created and validated for connectivity. Fourth, the organizational structure is mapped to the hardware structure to create the access map at block 220. Fifth, the software structure, as based on the business view, is mapped onto the access map at block 225 to create the deployment map at block 230. Next, the installation is run so as to map all software artifacts onto all the hardware resources. Then, the deployment map is used to rearrange the deployment for the change in software structure at block 235, changed artifacts at block 240, hardware changes at block 245, and organizational structure changes at block 250. Finally, access rights are created for the installed software system at block 255 by using the role and user information available as a part of the organizational information. The advantages of such a deployment scheme include flexibility, a live deployment map, the implementation of changes with minimal disruption, and ease of operation after the deployment.

Figure 7:
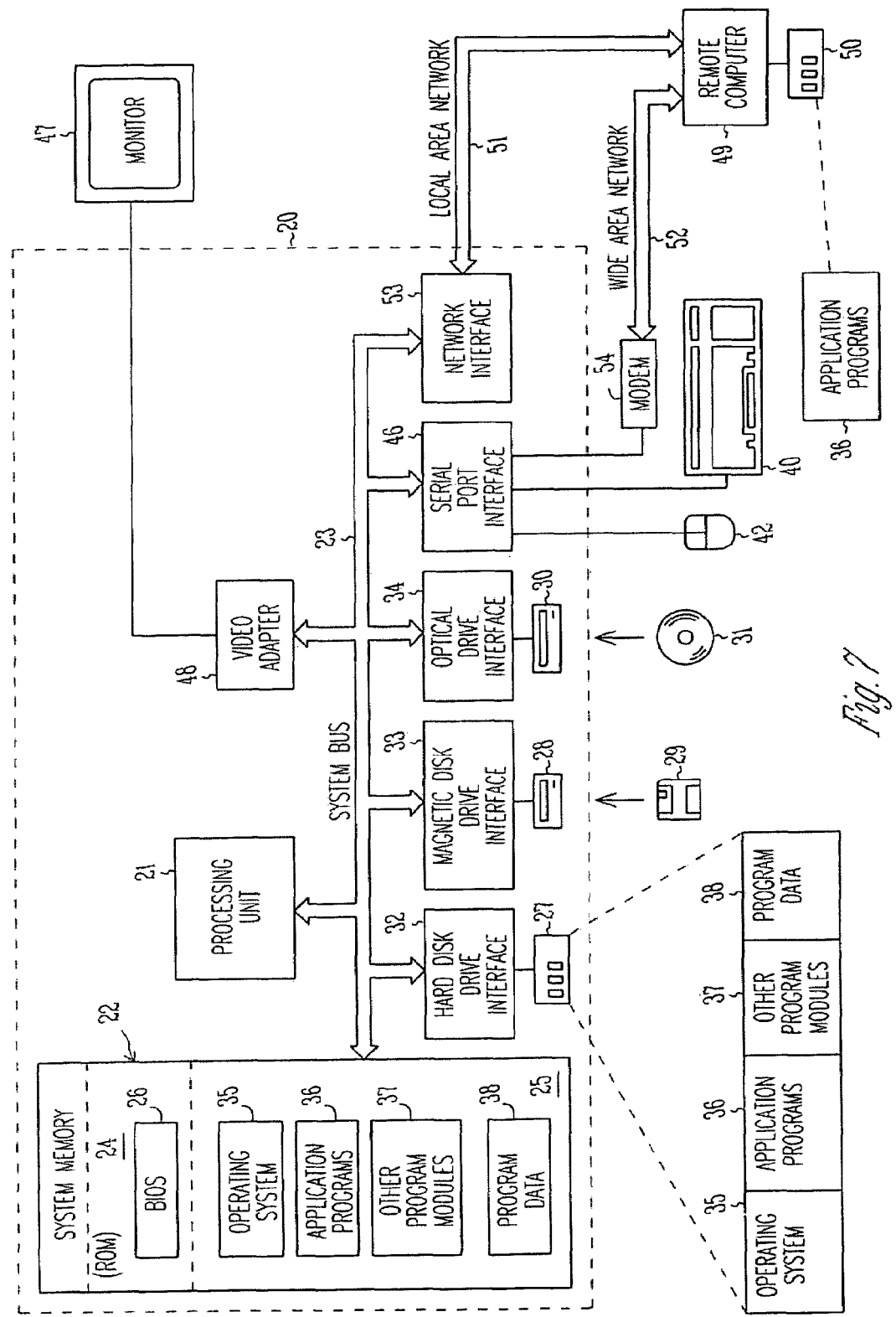
FIG. 7 illustrates a computer system upon which an embodiment of the invention may be operated to deploy a software system.

FIG. 7 is an overview diagram of a hardware and operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment. It is understood that the above description is intended to be illustrative, and not restrictive. It is intended to cover all alternatives, modifications, and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A model-driven method for automated deployment of software on a hardware platform in an organization comprising:
   retrieving a software structure from a repository, residing in a server processing system or in a client processing system or both, based on a business view of software;
   mapping artifacts of said software to said software structure, wherein said software structure comprise presentation layer, middle layer, and resource manager layer, and wherein components in said presentation layer and said middle layer are mapped to a machine and an appropriate application server instance, and required components in resource manager layer are mapped to machines where database servers are available;
   creating a map of an organizational structure of said organization;
   creating a map of a hardware topology of said hardware platform;
   creating an access map by mapping map of said organizational structure and map of said hardware topology;
   mapping said software structure onto said access map thereby creating a deployment map;
   installing said software thereby mapping said artifacts onto map of said hardware topology;
   setting up said deployment map including involves setting up and maintaining an organization unit, mapping said organization unit to said organization structure, creating users-roles mapping and role-deployment mapping in said deployment map;
   using said deployment map to deploy changes in said software structure, changes in said artifacts, changes in map of said hardware topology, and changes in map of said organizational structure; and
   creating access rights for users to access said software by using role information and user information from map of said organizational structure.

2. The method of claim 1, further comprising validating said mapping in map of said hardware topology.

3. The method of claim 1, further comprising validating map of said hardware topology for connectivity.

4. The method of claim 1, further comprising deploying said artifacts over a technology platform.

5. The method of claim 1, further comprising depositing said software structure in a specification repository.

6. A model-driven method for automated deployment of software on a hardware platform in an organization comprising:
   capturing information about software components and interactions of said software components in a model, wherein said information about said software components and interactions of said software components comprises a type of application server, instances of application servers in a machine, services offered by said software components and services used by said software components;
   packaging deliverables, wherein said deliverables are for said software components in said model can be automatically packaged along with necessary deployment descriptors;
   capturing topology of hardware including configuration information, and details of machines on which software components shall be deployed in said model;
   capturing layer information of said software in said model including information of presentation layer, middle layer, and resource manager layer; capturing database information in said model, wherein said database information comprises information about databases and database servers; and
   deploying said software by using said topology of hardware, said layer information, said database information and said packaged deliverables in said model, wherein deploying further comprise:
      developing said software components as a set of business components, and implementing organizational functions as business components,
      modeling business functions in a deployment repository,
      modeling hardware information,
      superimposing said hardware model with said business functions model thereby producing a composite model comprising a software layer, a hardware platform, a business function, and an organizational structure mapping,
      installing artifacts on a hardware platform by using said composite model, and
      generating required router information for routing information across different layers.

7. The method of claim 6, further comprising installing said software components on a machine based on said model information.

8. The method of claim 6, further comprising combining said model deployment scheme and a JMX architecture.

9. The method of claim 6, further comprising using said composite model to generate router information.

10. An article comprising a storage medium having instructions that when executed by a computing platform, result in execution of a model-driven method for deployment of software on a hardware platform in an organization comprising:
   retrieving a software structure from a repository, residing in a server processing system or in a client processing system or both, based on a business view of software;
   mapping artifacts to said software structure, wherein said software structure comprise presentation layer, middle layer, and resource manager layer, and wherein components in said presentation layer and said middle layer are mapped to a machine and an appropriate application server instance, and required components in resource manager layer are mapped to machines where database servers are available;
   creating a map of an organizational structure of said organization;

creating a map of a hardware topology of said hardware platform;

creating an access map by mapping map of said organizational structure and map of said hardware topology;

mapping said software structure onto said access map thereby creating a deployment map;

installing software thereby mapping said artifacts onto map of said hardware topology;

setting up said deployment map including involves setting up and maintaining an organization unit, mapping said organization unit to said organization structure, creating users-roles mapping and role-deployment mapping in said deployment map;

using said deployment map to deploy changes in said software structure, changes in said artifacts, changes in map of said hardware topology, and changes in map of said organizational structure; and creating access rights for users to access said software by using role information and user information from map of said organizational structure.

11. The article of claim 10, further comprising instructions for validating said mapping of map of said hardware topology.

12. The article of claim 10, further comprising instructions for depositing said software structure in a specification repository.

13. The article of claim 10, further comprising instructions for validating map of said hardware topology for connectivity.

14. The article of claim 10, further comprising instructions for deploying said artifacts over a technology platform.

15. An article comprising a storage medium having instructions that when executed by a computing platform, result in execution of a model-driven method for automated deployment of software on a hardware platform in an organization comprising:

capturing information about software components and interactions of said software components in a model, wherein said information about said software components and interactions of said software components comprises a type of application server, instances of application servers in a machine, services offered by said software components and services used by said software components;

packaging deliverables, wherein said deliverables are for said software components in said model can be automatically packaged along with necessary deployment descriptors;

capturing topology of hardware including configuration information, and details of machines on which software components shall be deployed in said model;

capturing layer information of said software in said model including information of presentation layer, middle layer, and resource manager layer;

capturing database information in said model, wherein said database information comprises information about databases and database servers; and deploying said software by using said topology of hardware, said layer information, said database information and said packaged deliverables in said model, wherein deploying further comprise:

developing said software components as a set of business components, and implementing organizational functions as business components, modeling business functions in a deployment repository, modeling hardware information, superimposing said hardware model with said business functions model thereby producing a composite model comprising a software layer, a hardware platform, a business function, and an organizational structure mapping, installing artifacts on a hardware platform by using said composite model, and generating required router information for routing information across different layers.

16. The article of claim 15, further comprising instructions for installing said software components on a machine based on said model information.

17. The article of claim 15, further comprising instructions for combining said model deployment scheme and a JMX architecture.

18. The article of claim 15, further comprising instructions for using said composite model to generate router information.

* * * * *